United States Patent
Hui (10) Patent No.: US 6,320,838 B1
(45) Date of Patent: *Nov. 20, 2001

(54) COMPACT DISC STORAGE AND RETRIEVAL SYSTEM

(76) Inventor: John Hui, 12300 Eddison Way, Garden Grove, CA (US) 92841

( * ) Notice: Subject to any disclaimer, the term of this patent is extended or adjusted under 35 U.S.C. 154(b) by 0 days.

This patent is subject to a terminal disclaimer.

(21) Appl. No.: 09/650,931

(22) Filed: Aug. 29, 2000

Related U.S. Application Data (63) Continuation of application No. 09/227,001, filed on Jan. 7, 1999, now Pat. No. 6,111,848.

(51) Int. Cl.$^7$ .................................................. G11B 17/04
(52) U.S. Cl. ........................................................... 369/178
(58) Field of Search .................................... 369/178, 191, 369/192, 34, 36, 37, 75.1–75.2

(56) References Cited

U.S. PATENT DOCUMENTS 5,235,579 * 8/1993 Ross ........................................ 369/37

* cited by examiner

Primary Examiner—Allen Cao (74) Attorney, Agent, or Firm—Charles H. Thomas (57) ABSTRACT

A compact disc storage and retrieval system is arranged to selectively push forward a single, selected compact disc from within a plurality of compact disc storage slots located within a case. Each compact disc storage slot is provided with a spring loaded push rod which, when actuated, pushes a selected compact disc or compact disc case partially out of an ejection opening. Each push rod passes through an aperture in a longitudinal partition extending the length of the compact disc filer case. A coil spring is disposed about the push rod between the partition and the compact disc or compact disc case. Each push rod is provided with an annular detent channel about its outer circumference. In the normal position in which each compact disc is stored, the coil spring is compressed and a solenoid associated therewith has a latching fork that engages the detent channel in the push rod to hold it in the retracted position with the push rod spring depressed. Upon receipt of an electronic signal the solenoid latching fork is withdrawn, thus allowing the compressed coil spring to push the compact disc case outwardly from the longitudinal partition. This makes the selected compact disc visually identifiable and available for withdrawal from the compact disc filer. Each compact disc filer is provided with a microprocessor that performs the function of a digital matrix selection or routing system that triggers only the solenoid associated with the selected compact disc to eject it from the storage case. The signal to the solenoid is through the keyboard of a conventional, personal computer.

3 Claims, 9 Drawing Sheets

COMPACT DISC STORAGE AND RETRIEVAL SYSTEM

The present application is a continuation of U.S. application Ser. No. 09/227,001 filed Jan. 7, 1999, U.S. Pat. No. 6,111,848.

BACKGROUND OF THE INVENTION

1. Field of the Invention

The present invention relates to a system for the storage of a plurality of compact discs in which retrieval of a selected disc is performed by designating the compact disc desired through an electronic input to the system.

2. Description of the Prior Art

Compact disc filers or containers have been developed in which a plurality of compact discs are stored in separate compartments within a single case. Such conventional devices typically employ a spring-loaded mechanism which is depressed and latched when the compact disc is inserted. When a particular compact disc is to be retrieved, the user must locate the proper enclosure and manually operate a mechanical trigger associated with the particular compartment in which the desired compact disc is located. Manual actuation of the trigger releases the spring mechanism and causes the compact disc to be expelled or partially expelled from the enclosure in which it is kept.

While the retrieval of a compact disc in this manner is easily achieved, the location of the proper compartment is much more difficult. This is particularly true in the case of storage systems for compact discs containing musical selections since often a collector of musical DCs may be quite voluminous. Due to the narrow size of compact discs, it is difficult to label each compartment with an indicia adequately identifying the particular compact disc stored therein. Rather, conventional systems for large collections of compact discs typically require the use of a written or printed list of the titles of the compact discs, sorted in alphabetic or some other logical order, followed by an identification of the particular enclosure in which the compact disc is located. The compartment indicia may be a number which fits more easily into the space available to identify each compartment. Even so, numerical indicia of compartments must still be quite small in order to fit into the space available.

Moreover, each time one compact disc in added to the unit, or each time a compact disc is removed, the printed list must be updated. The task of maintaining an updated listing of the compact discs in the CD filer housing, and a correlated identification number of the specific compart in which each disc is located is an arduous, time consuming task. As a consequence, a printed list is often out of date, thus creating problems in locating a particular compact disc in the CD filer from among all of the compacts discs stored therein.

SUMMARY OF THE INVENTION

The present invention involves the storage and selection of compact discs from a housing case, rack, stack, or other container which holds a number of different compact discs. Each compact disc or compact disc case is located in a compact disc slot within the housing. Guides separate the slots from each other. According to the present invention, each compact disc positioned in the rack is provided with a spring-loaded mechanism which, when actuated, pushes a selected compact disc or compact disc case partially out of the housing.

In the normal position in which the compact disc is stored, the spring is in a state of elastic deformation and is latched in that condition with a latch that may be either mechanical, magnetic, or electrical in nature. A separate solenoid is located at each compact disc slot and operates a latch that, when the solenoid is actuated, will release the spring of the disc ejection mechanism located at that compact disc slot, thereby partially ejecting the compact disc from the case or container in which it is stored. This makes the selected compact disc readily distinguishable from the other compact discs, since it is the only one protruding from the case or container housing the plurality of compact discs.

To further facilitate quick visual location of the selected compact disc, a visual indicator may be provided for each compact disc slot. When a solenoid for a particular compact disc slot is actuated to partially eject a compact disc from the selected slot, the visual indicator associated with that particular slot is illuminated.

The signal to the solenoid is provided from a keyboard which may be utilized to input information identifying the title of the desired compact disc. This information is processed through an electronic matrix or routing system that is connected between the electronic input device and the array of solenoids in the compact disc container. The function of the matrix or routing system may be performed under the control of a conventional central processing unit found in commercially available personal computers.

In a preferred embodiment of the invention, the user utilizes the keyboard of a conventional personal computer to bring up a menu of all available compact discs stored in the CD filer. The user then, using a conventional computer program, types in the first few letters of the title of the compact disc desired. As the user types in the letters the title corresponding most closely to the letters inputted through the keyboard is highlighted on the personal computer video monitor screen. Once the user identifies the desired title in the menu on the monitor screen, that title can be selected, typically using a "mouse", "roller ball" or other conventional cursor control mechanism.

An electronic address is associated with each compact disc slot and with each title in the menu, typically by storage on a personal computer hard drive. Once a particular compact disc has been selected from the menu, an address signal associated with the particular slot in which the selected compact disc is stored is generated. The address signal is transmitted through an electrical connector to matrix or routing circuitry located in the compact disc filer. The function of the matrix or routing circuitry may be performed by a microprocessor located within each CD filer case. The matrix or routing circuitry activated by the selection of a compact disc will actuate one, and only one, solenoid in the compact disc case. This solenoid is located at the compact disc slot in which the selected compact disc is stored.

Actuation of the specific solenoid located at the compact disc slot selected releases a latching mechanism which allows an elastically deformed spring located at the selected compact disc slot to push or pull the selected compact disc partially out of its dedicated slot. The protrusion of the selected compact disc from the CD filer is readily apparent to the user. Furthermore, the case may be provided with a plurality of visual indicia for each compact disc slot, such as a plurality of lighted diodes, one located at each slot. The partial ejection of a selected compact disc is accompanied by illumination of the LED located at that slot. This further aids in readily visually locating the selected compact disc.

In one broad aspect the present invention may be considered to be a compact disc storage and retrieval system comprised of several elements. The system includes a compact disc filer having a plurality of compact disc storage slots located side by side and delineated from each other by a plurality of guides located therebetween. A separately actuable compact disc ejection mechanism is mounted on the storage case at each of the compact disc storage slots. All of the ejection mechanisms are operable to move between retracted positions which permit the compact discs to reside stored in the storage slots and ejection positions in which the compact discs are forced at least partially out of the storage slots.

Each ejection mechanism includes a spring moveable between a relaxed condition when the disc ejection mechanism associated therewith is in its ejection position, and an elastically deformed condition when the ejection mechanism associated therewith is in its retracted position. Latching mechanisms are provided for each of the storage slots for holding the disc ejection mechanisms in their retracted positions with the springs in their elastically deformed conditions.

A plurality of solenoid are also provided. Each solenoid is located at a separate one of the compact disc storage slots. The solenoids selectively and individually release the latching mechanisms to allow the springs to return from their elastically deformed conditions to their relaxed conditions. A keyboard is provided through which each of the solenoids is selectively and individually addressable with an electronically encoded solenoid address. A central processing unit is connected to the keyboard and to the solenoids to transmit a storage slot address code selected at the keyboard to activate only a single solenoid that is responsive to the selected storage slot address code.

Preferably a separate visual indicator is located proximate each of the compact disc storage slots. The central processing unit is connected to the visual indicators to transmit a signal to concurrently illuminate the visual indicator located at the same compact disc storage slot at which the solenoid responsive to the selected storage slot address code is located.

The compact disc filer case in which the compact discs are stored is preferably constructed in a modular design. When warranted by the number of compact discs to be stored and accessed, a plurality of compact disc filers, each constructed as previously described, are serially linked together through serial electronic connections.

In the operation of the invention the keyboard entry address signal generating input device is capable of specifying a multiplicity of electronic addresses. The central processing unit controls an electronic matrix system connected between the electronic input device and the solenoids. This matrix system defines a unique compact disc storage slot address for each of the solenoids. The matrix system is responsive to entries on the keyboard entry address signal generating input device to actuate only a selected one of the solenoids. This actuation releases the spring of the disc ejection mechanism associated therewith. This compact disc ejection mechanism thereupon moves from its retracted to its ejection position.

The central processing unit may also be considered to be the control for a routing system connected between the electronic input device and the solenoids to define a unique address for each of the solenoids. The logic component of the routing system may be a small, dedicated microprocessor which is responsive to entries on the keyboard entry address signal generating input device to select a particular solenoid and its associated LED. The input of a keyboard storage slot identification entry thereby actuates only the solenoid located at the storage slot identified.

The invention may be described with greater clarity and particularity by reference to the accompanying drawings.

DESCRIPTION OF THE EMBODIMENT

Figure 1:
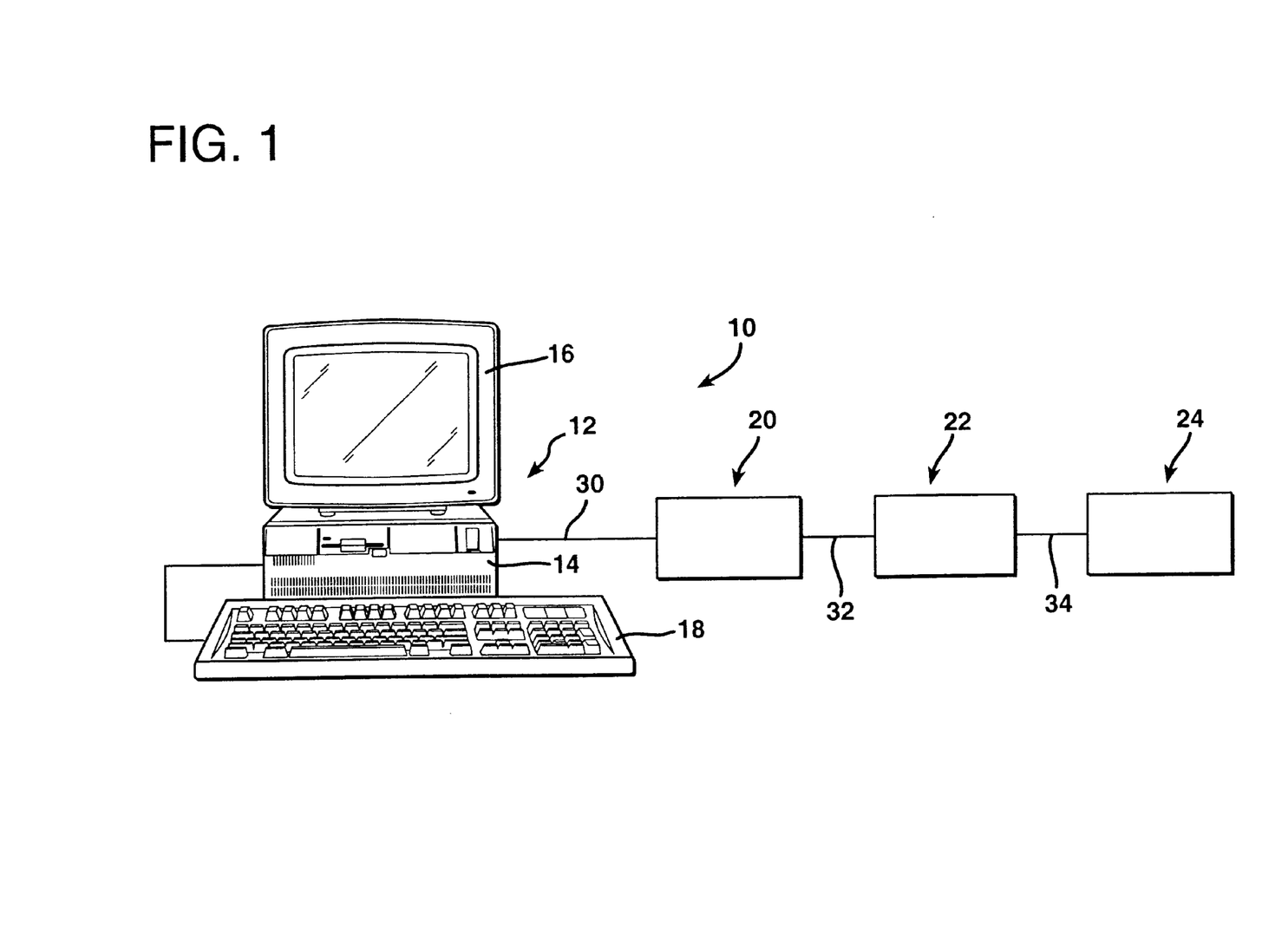
FIG. 1 is a block diagram illustrating one preferred embodiment of a compact disc storage and retrieval storage system according to the invention.

FIG. 1 illustrates generally at 10 a compact disc storage and retrieval system constructed according to the present invention. The compact disc storage and retrieval system 10 includes a conventional, basic personal computer indicated at 12, which includes a central processing unit 14, a monitor 16, and a keyboard 18. A suitable, conventional central processing unit 14 may employ a Pentium II® microprocessor. The monitor 16 and keyboard 18 are conventional devices that are compatible therewith and electronically coupled thereto through conventional connection cords.

In the embodiment of the compact disc storage and retrieval system 10 depicted, a plurality of compact disc filers 20, 22, and 24 are employed. Each compact disc filer 20, 22, and 24 supports the storage of 56 compact discs. The compact disc filers 20, 22, and 24 may be cascaded together in daisy chain fashion. Up to eight compact disc filers may be serially connected together. This provides support for up to four hundred forty-eight compact discs. The system is architected to be flexible. Support for more than eight cascaded compact disc filers is not bandwidth limited by the architecture. Rather, the limitation in the number of compact disc filers is controlled by the direct current drops in the RS232 daisy chain.

Figure 5:
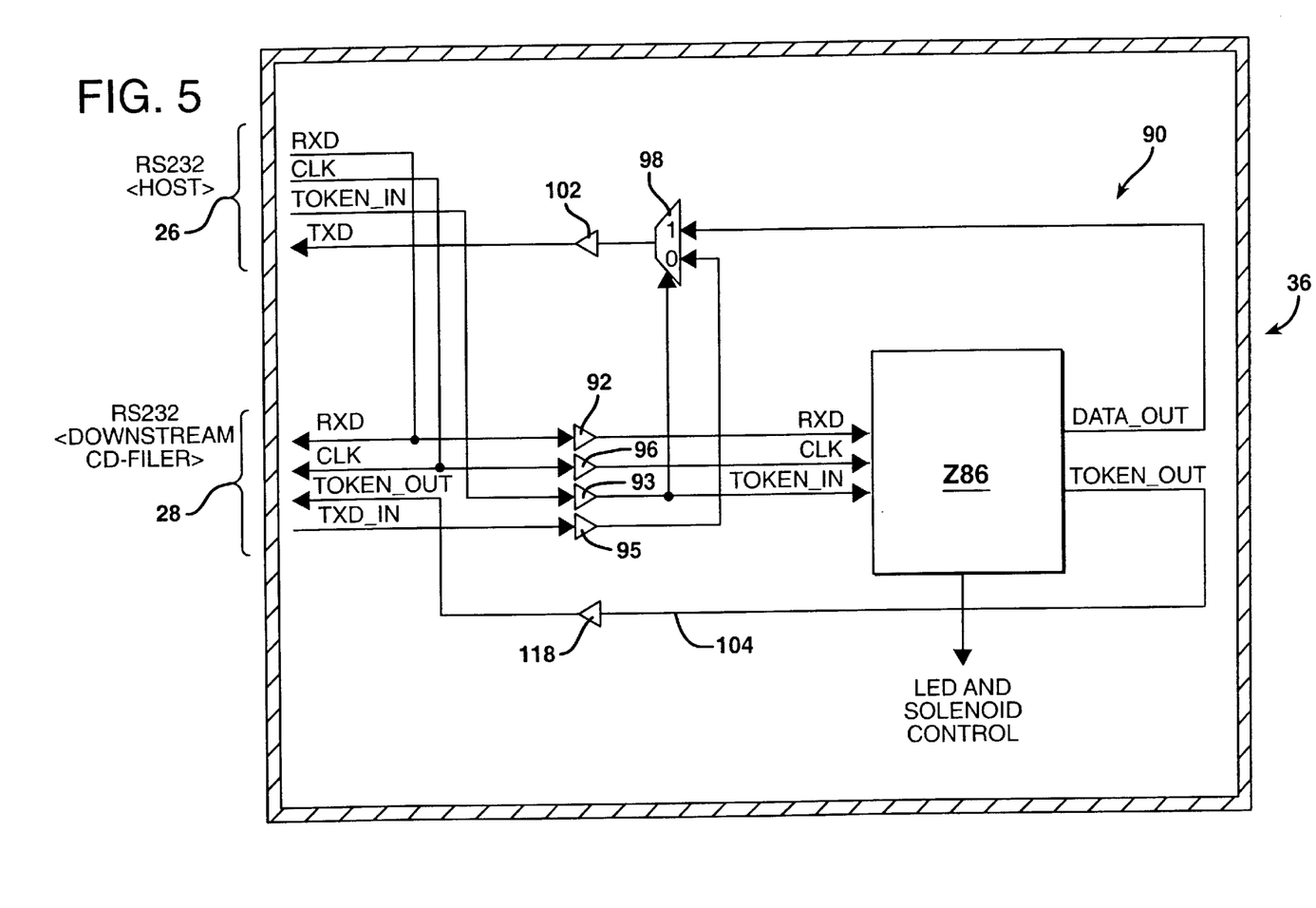
FIG. 5 is a block diagram showing the internal electronic connections of a compact disc filer controller circuit within each of the compact disc filers shown in FIG. 1.

The compact disc filers 20, 22, and 24 are all of a modular design and are structurally identical with each other. The compact disc filers 20, 22, and 24 each have two conventional serial RS232 electrical connection ports 26 and 28, as depicted in FIG. 5. The connection ports 26 and 28 are respectively connected to the upstream and downstream (if any) compact disc filers in the system. That is, the port 26 of compact disc filer 20 is connected to the central processor 14, by a multiple wire cable 30 while the port 28 of the compact disc filer 20 is connected as an output to the downstream compact disc filer 22. The upstream port 26 of compact disc filer 22 is coupled to the downstream port 28 of the compact disc filer 20 by a multiple wire cable 32. The downstream port 28 of the compact disc filer 22 is coupled to the upstream port 26 of compact disc filer 24 by another multiple wire connector 34.

Figure 2:
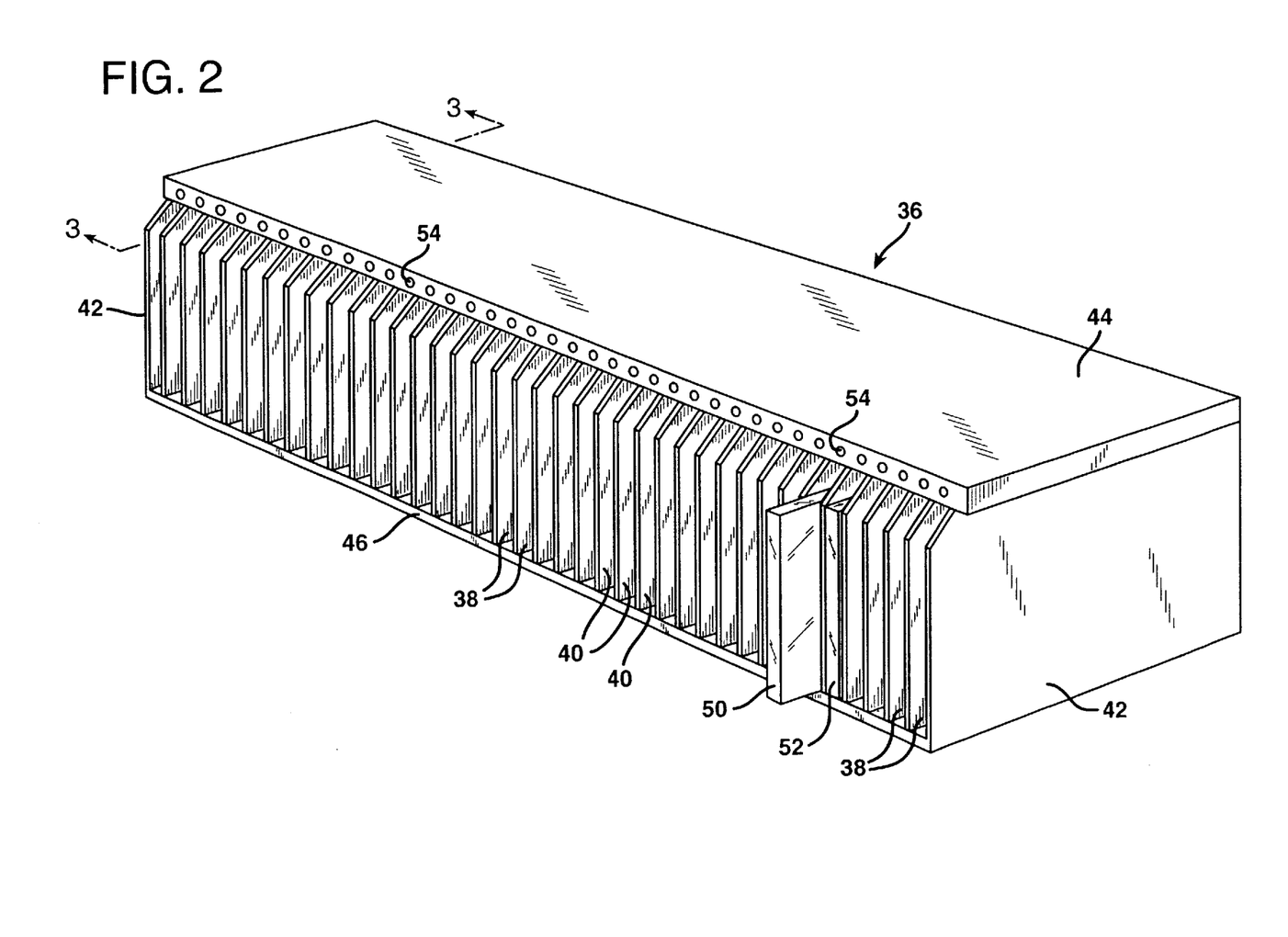
FIG. 2 is a perspective view of one of the compact disc filers employed in the system of FIG. 1.

FIG. 2 illustrates the physical external appearance of one preferred embodiment of a compact disc filer employed in the disc storage and retrieval system 10 according to the invention. The enclosing structure for each compact disc filer may take the form of an elongated, generally box-shaped housing or case 36 having a plurality of compact disc slots 38 located side by side and delineated from each other by a plurality of guides 40 therebetween. The guides 40 may take the form of upright partitions having a generally rectangular configuration, but with the upper, outside corner removed therefrom. The ends 42 of the compact disc filer case 36 have basically the same configuration as the interior guide partitions 40. Because the upper, outside corners of the partitions 40 and the ends 42 are clipped, the flat, rectangular top 44 of the filer case 36 is slightly narrower than the bottom 46 thereof. In the preferred embodiment of the invention the partition guides 40 and the ends 42 of the compact disc filer case 36 define 56 separate compact disc storage slots 38, although fewer than that number are illustrated in the drawing of FIG. 2 for ease and clarity of illustration.

Each of the compact disc filers 20, 22, and 24 is an electronically controlled compact disc rack that incorporates solenoid activated mechanical switches that eject a particular compact disc or compact disc storage case. Only two of which are illustrated at 50 and 52 in FIG. 2. While the compact discs 50 and 52 are typically housed within plastic compact disc cases or "jewel boxes", the system is also applicable to an arrangement in which these conventional disc storage cases are not employed. In such an arrangement, each compact disc slot 38 would preferably be equipped with some type of holder or carriage in which the actual, disc-shaped compact disc is placed to prevent the compact disc from becoming scratched.

The box-shaped structure 36 forming the compact disc filer case has an open side, which is the front of the unit in FIG. 2, at which a selected compact disc 50 is shown partially ejected. In the preferred embodiment of the compact disc storage and retrieval system 10, each compact disc filer 20, 22, and 24 is provided with a separate visual indicator 54. These indicators 54 are located proximate each of the compact disc storage slots 38. In the embodiment illustrated in FIG. 2, each of these visual indicators 54 is a light emitting diode (LED) located in the top 44 of the compact disc filer case 36 at the open front side thereof where the compact discs are ejected.

The selection and identification of the particular compact disc 50 which is ejected is controlled by the personal computer 12, which may be considered to be a host. Communication from the host computer 12 to each of the compact disc filers 20, 22, and 24 is accomplished through the cable connections to the ports 26 and 28 of the compact disc filers 20, 22, and 24.

A compact disc filer driver resides in the host computer 12 and interfaces a compact disc file application to the series of compact disc filers 20, 22, and 24. The compact disc filer driver allows the application to communicate to all of the compact disc filers 20, 22, and 24 and supports compact disc filer commands and compact disc filer broadcast control sequences. In the preferred embodiment there is one broadcast control sequence RESET which resets all of the compact disc filers in the topology.

Through the compact disc filer driver, the compact disc file application program in the computer 12 is allowed to perform the following compact disc filer operations. First, there is a compact disc slot highlight. The selected compact disc 50 in an application-specified slot 38 is highlighted by lighting up its associated LED 54. One, and only one, compact disc slot 38 is highlighted at a time.

The second function performed by the compact disc filer operation is compact disc ejection. The selected compact disc 50 in an application-specified slot is ejected by activation of a solenoid-activated spring switch ejection mechanism 56.

Figure 3:
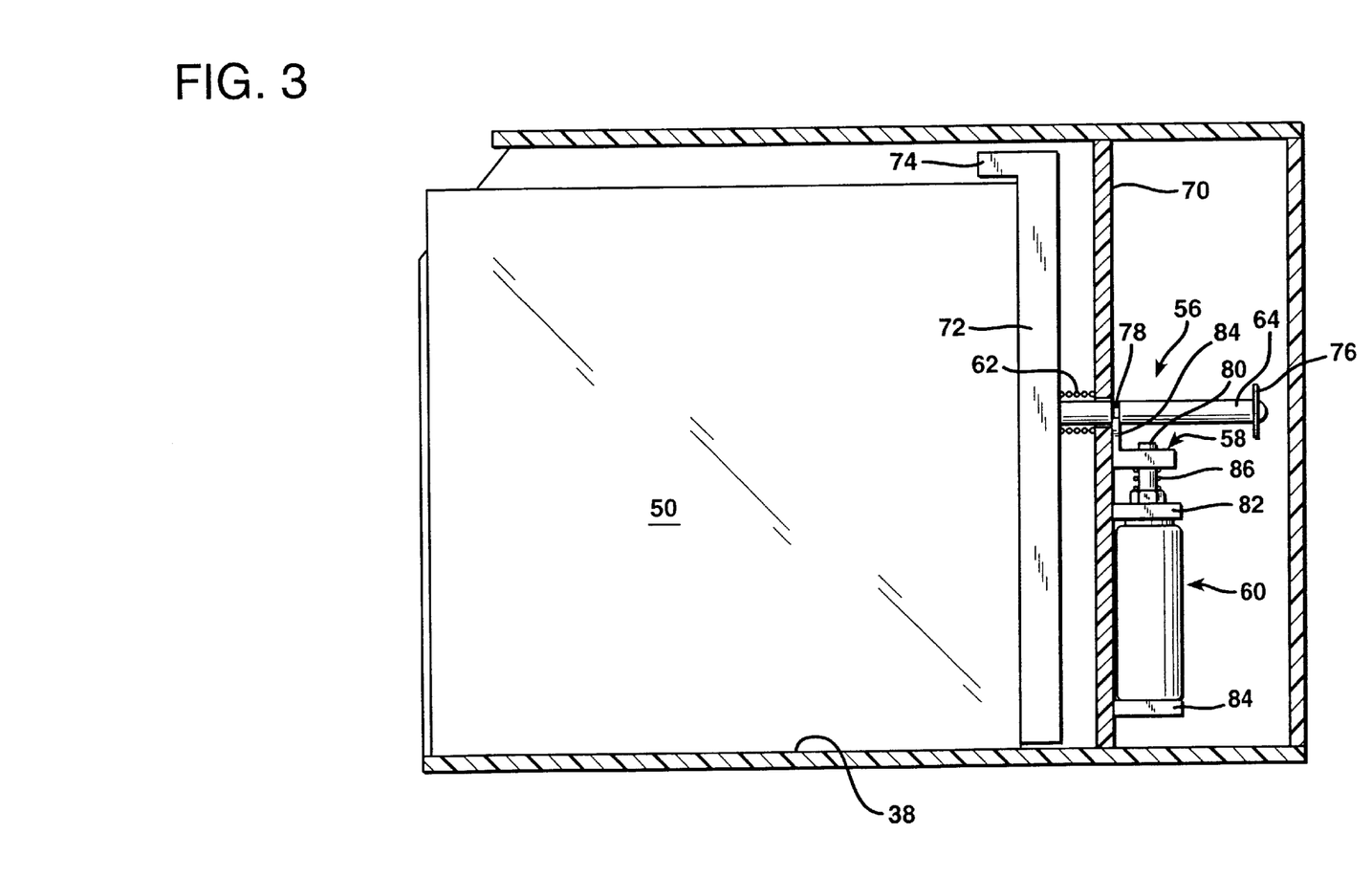
FIG. 3 is a side sectional elevational view taken through a single one of the compact disc storage slots, as indicated at 3—3 of FIG. 2, showing a compact disc in its stored position.

FIGS. 2 and 3 illustrate the operation of a compact disc ejection mechanism 56, a latching mechanism 58, and a solenoid 60 according to the invention. A separately actuable compact disc ejection mechanism 56 is mounted on each of the compact disc filers 20, 22, and 24 at each of the compact disc storage slots 38. All of the ejection mechanisms 56 are operable to move between retracted positions, depicted in FIG. 3, which permit the compact discs 50 and 52 to reside stored within the storage slots 36, and ejection positions, depicted in FIG. 4, in which the single selected compact disc 50 is forced at least partially out of the storage slot 38.

Figure 4:
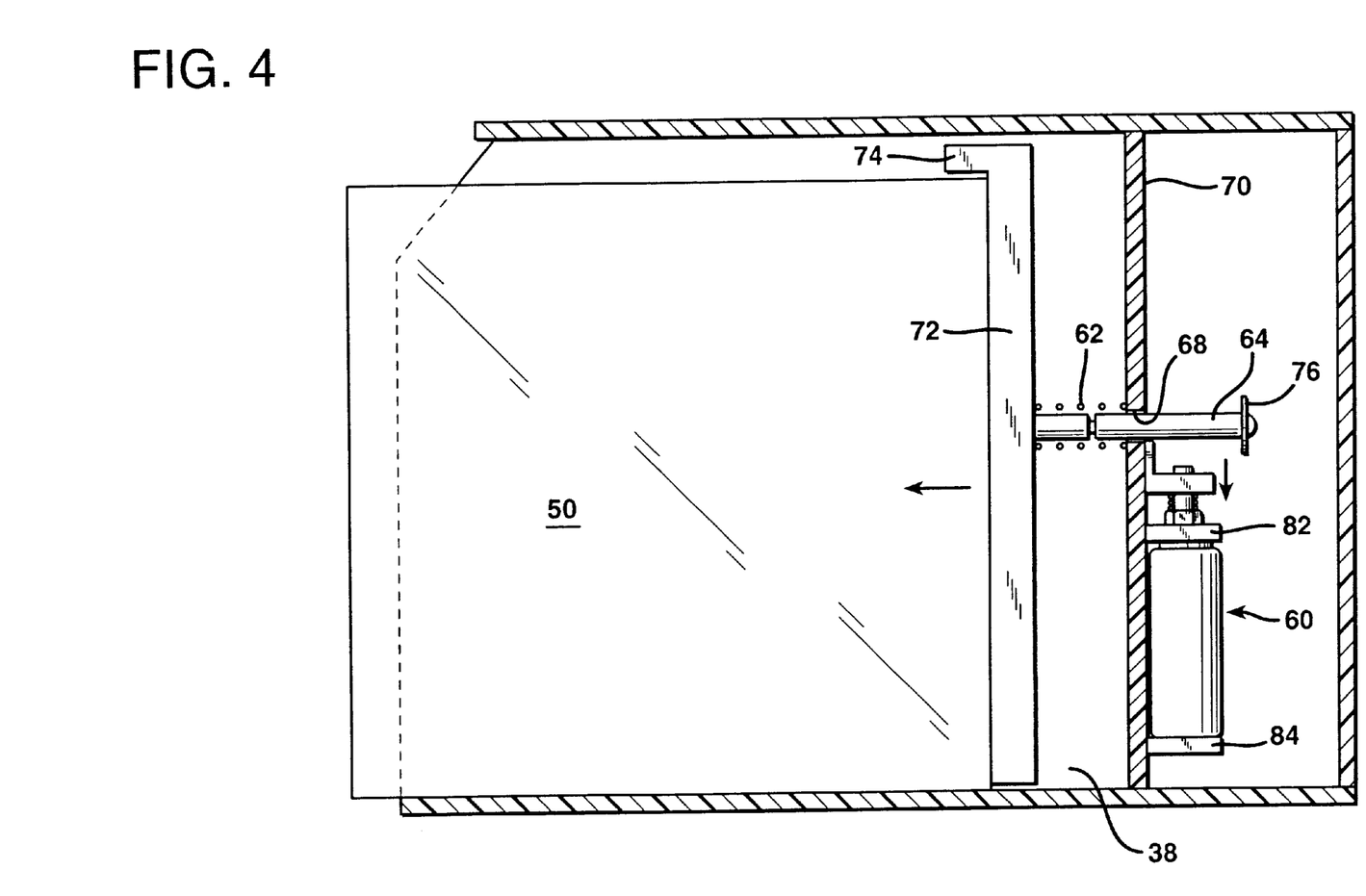
FIG. 4 is a side sectional elevational view taken through a single one of the compact disc storage slots, as indicated at 3—3 of FIG. 2, showing a compact disc in its ejected position.

Each ejection mechanism 56 includes a coil spring 62 disposed coaxially about a push rod 64. An aperture 68 is defined through a longitudinal partition 70 that extends the entire internal length of the compact disc filer case 36 behind each of the compact disc storage slots 38. A push rod 64 passes through an aperture 68 at each of the slots 38.

The outboard end of each push rod 64 is connected to a tall, narrow plunger 72, having a forwardly directed retaining finger 74 at its upper extremity. The plunger 72 in only slightly smaller in cross section than the storage slot 38 within which it moves. The rear end of the push rod 64 terminates in a relatively broad stopper 76 that is larger in cross section than the opening 68. The stopper 76 prevents the push rod 64 from travelling completely through the longitudinal partition 70.

Each push rod 64 is provided with an annular groove or detent channel 78 about its outer circumference. The necked down region 78 reduces the diameter of the push rod 64 at that location to provide a shoulder that is engageable by the latching mechanism 58.

The solenoid 60 is a conventional electrical solenoid having an armature 80 that is reciprocally movable in a vertical direction in response to activation of its electrical coil. Each solenoid 60 is mounted on the rear face of the longitudinal partition 70 by means of longitudinally extending, horizontally disposed mounting plates 82 and 84. A solenoid 60 is mounted directly behind each of the storage slots 38 on the opposite side of the longitudinal partition 70 therefrom. The upper extremity of the solenoid armature 80 is secured to the horizontally disposed base of a latching mechanism 58 associated therewith.

The base of the latching mechanism 58 is secured in the manner of a collar around the upper extremity of the armature 80. Each latching mechanism 58 also includes a vertically disposed fork-shaped latching element 84 extending upwardly from the base of the latching mechanism 58 directly beneath the push rod 64. The fork-shaped latching element 84 is biased upwardly by a solenoid spring 86 that is compressed between the underside of the base of the latching mechanism 58 and the top of the solenoid body. The fork-shaped latching element 84 engages the shoulder formed on the push rod 64 at the annular detent channel 78 thereon to hold the disc ejection mechanism 56 with which it is associated in the retracted position with the coil spring 62 thereof in its elastically deformed condition, as depicted in FIG. 3, except when the solenoid 60 is actuated.

When the solenoid 60 is actuated, the armature 80 thereof is drawn down into the solenoid core by an electromagnetic force. This force is sufficient to overcome the upward bias on the latching mechanism 58 provided by the solenoid spring 86 to thereby withdraw the fork-shaped latching element 84 from engagement with the shoulder formed in the push rod 64 at the annual detent channel 78 thereof. When the latching element 84 has been withdrawn downwardly, as depicted in FIG. 4, the coil spring 62 is no longer restrained. The coil spring 62 thereupon moves from its elastically deformed condition, illustrated in FIG. 3, to its relaxed condition, illustrated in FIG. 4. The coil spring 62 thereby urges the plunger 72 forwardly, thereby partially ejecting the selected compact disc 50 from its storage slot 38, as illustrated in FIGS. 2 and 4. When the selected compact disc 50 has been partially ejected as illustrated, it is readily visible to the user, since it sticks out further from the case 36 of the compact disc filer 20, 22, or 24 in which it is located a significantly greater distance than all of the other nonselected compact discs 52.

Concurrently with ejection of the compact disc 50 from the selected compact disc storage slot 38, the system illuminates the visual LED indicator 54 directly above the selected compact disc 50. This further aids in immediately visually recognizing which of the compact discs has been ejected.

Actuation of the solenoid 60 lasts for only a moment. Upon actuation, the electromagnetic force pulling the armature 80 down into the core of the solenoid 60 is applied and then terminated. The duration of the electromagnetic force is sufficient to release the ejection mechanism 56, however, thus allowing the push rod 64 and the plunger 72 to move from the positions depicted in FIG. 3 to the positions depicted in FIG. 4. Thereafter, the solenoid spring 86 applies an upward force on the latching mechanism 58. However, the gap in the fork element 84 of tle latching mechanism 58 is too small to allow the latching element 84 to engage the outer circumference of the push rod 64, except at the annular detent channel 78. Therefore, following actuation of the solenoid 60 and partial ejection of the selected compact disc 50, as depicted in FIG. 4, the latching element 58 cannot reengage the push rod 64 until tile selected compact disc 50 has been pushed back against the plunger 72 to compress tile coil spring 62 sufficiently until tile detent channel 78 of the push rod 64 returns to alignment with the fork in the latching element 84. Once this does occur, however, the obstruction preventing upward movement of the latching element 84 is removed so that the solenoid spring 86 returns the latching element 84 into engagement with the shoulder of the push rod 64 at the annular detent channel 78 thereof. Therefore, the compact discs 52 will remain in position within the confines of their respective compact disc slots 38 even when inward pressure against tile coil spring 62 is removed. Each ejection mechanism 56 will thereby remain in its retracted position, depicted in FIG. 3, until or unless the solenoid 60 associated therewith is actuated.

The ejection of a selected compact disc 50 is controlled by the compact disc filer control circuit 90 of the compact disc filer in which the selected compact disc 50 is located. The compact disc filer control circuit 90 is shown in FIG. 5. Tile circuitry 90 in FIG. 5 is in turn controlled by the central processing unit 14 of the personal computer 12. A separate compact disc filer control circuit 90 resides in each of the compact disc filers 20, 22, and 24.

The compact disc filer control circuit 90 terminates at the upstream RS232 port 26 and at the downstream RS232 port 28 and includes some digital control circuitry that is mastered by a single-chip microprocessor Z86. The microprocessor Z86 is directed by the host application in the central processing unit 14 through the compact disc filer driver, also located within the central processing unit 14. The microprocessor Z86 may be a Zilog Model Z86C02 microcomputer.

The RS232 ports 26 and 28 utilized in the system are commercially available DB9 ports having 9-pin connections, although only four of the connections are utilized in the cabling to the compact disc filers 20, 22, and 24. The input signals on the pins actually utilized in the system are labelled RXD, CLK, TOKEN_IN, and TXD at the ports 26 and are labelled RXD, CLK, TOKEN_OUT, and TXD_IN in the ports 28 illustrated in FIG. 5.

The central processing unit 14 of the personal computer 12 sends data to all of the compact disc filers 20, 22, and 24 through a connection to Pin 3 at both the upstream RS232 ports 26 and at the downstream RS232 ports 28 thereof. The input data from the personal computer 12 is passed on cable 30 through the upstream port 26 of the compact disc filer 20 and directly back out through the downstream port 28 of the compact disc filer 20, as illustrated schematically in FIG. 6A. The signal at Pin 3 is the signal RXD which is fed in two directions. It is fed out through the downstream port 28 of compact disc filer 20 on cable 32 to Pin 3 of the upstream port 26 of the compact disc filer 22. From there it is fed through Pin 3 of the downstream port 28 of compact disc filer 22 on cable 34 to Pin 3 at the upstream port 26 of compact disc filer 24. The connection of Pin 3 of the upstream port 26 to Pin 3 of the downstream port 28 in each of the compact disc filers 20 and 22 provides the daisy chain effect by which data is passed concurrently to all of the CD filers 20, 22, and 24.

At the same time within each compact disc filer the RXD signal is fed to a buffer inverter 92. The buffer inverters 92, 93, 95, and 96 all convert RS232 voltages to TTL or CMOS voltages. They therefore all function as voltage converters and together form an RS232 to TTL transceiver 97. The RXD output of voltage converter 92 is passed on line 111 to an input/output port P25 of the microprocessor Z86. Shown in FIG. 6B. The RXD signal is also directed to the clock input of a J-K flip-flop circuit 94.

The input P25 to the Z86 microprocessor is read as a data input on line 111 by the Z86 microprocessor. Communication to the compact disc filers 20, 22, and 24 is serial. Data is byte granular and is passed in bites packaged with a start and stop bit. Data may take the form of operation commands or operation data.

The data input on line P25 commences with a start bit which is followed by the least significant bit of data in the byte. The remaining bits of data arrive in reverse order of significance, proceeding from the least significant to the most significant bit in the byte. The last data bit in the byte is followed by a stop bit.

The personal computer 12 also transmits a clock signal CLK to Pin 7 of the upstream RS232 port 26 of compact disc filer 20. This clock input is also cascaded to Pin 7 of the downstream RS232 port 28 of the compact disc filer 20, through cable 32 to Pin 7 of the upstream port 26 of compact disc filer 22. Similarly, from Pin 7 of the upstream port 26 of compact disc filer 22 the CLK signal is passed to Pin 7 of the downstream port 28 of compact disc filer 22 and on to Pin 7 of the upstream port 26 of compact disc filer 24 over cable 34.

The CLK signal is also provided as an input to voltage buffer 96 in each of the compact disc filers 20, 22, and 24. The CLK output of voltage buffer 96 is directed as an input in line 115 to the Z86 microprocessor as an input P32 thereto.

Once a CLK signal reaches the Z86 microprocessor, the program within the Z86 microprocessor looks at the RXD input at connection P25 at the low-to-high transition of the CLK signal on input P32. According to the protocol adopted, the first data bit of the RXD data signal must be a zero, which serves as a start bit. If this first data bit of the RXD signal at the P25 input to the Z86 microprocessor is not a zero, an error has occurred.

Figure 8:
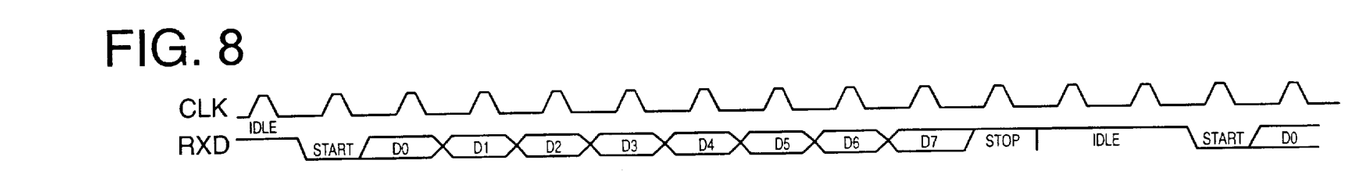
FIG. 8 is a timing diagram depicting how data is passed from the personal computer shown in FIG. 1 to the circuitry shown in FIG. 6B.

The Z86 microprocessor performs a verification check to ensure that the data received on line P25 is in a valid data format. Specifically, each byte of data received on line P25 must commence with a zero and end with a one. If it does not the Z86 microprocessor treats the signal as an invalid transmission. The timing relationship between the CLK signal on line P32 and the data signal, which is the RXD signal, on line P25 is depicted in FIG. 8.

Figure 9:
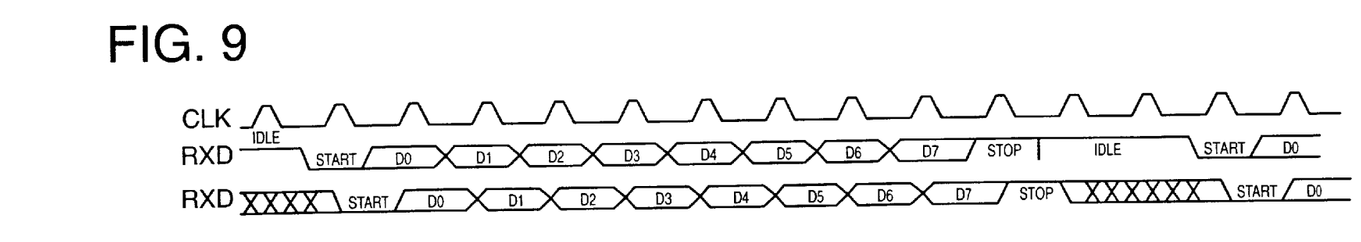
FIG. 9 is a timing diagram depicting how the circuitry shown in FIG. 6 returns an echo signal to the personal computer shown in FIG. 1.

The Z86 microprocessor is configured to echo everything it receives from the host computer 12 back to the host computer 12. The output echo of the RXD signal appears at line P24 of the Z86 microprocessor. The echo of the RXD signal on line 113 from Pin P24 is directed to Pin 1A of a 74HC157 two-to-one multiplexing circuit 98. From the multiplexer 98 the RXD echo is directed on line 100 to a NAND gate 102 which forms part of a TTL-to-RS232 voltage transceiver 101. The NAND gates in the transceiver 101 all function as buffers that convert the CMOS or TTL voltage levels back to the RS232 voltage levels. Each echo signal to the personal computer 12 from the microprocessor Z86 appears on line P24 and is passed to the multiplexer 98. Each output from the mulitplexer 98 appears as a TXD signal to the transceiver 101 on the line 100. The timing of relationship between the CLK signal on line 115 to Pin P32, the RXD signal on line P25, and the TXD signal on line 100 is illustrated in FIG. 9.

The echo signal TXD provides a means for the host computer 12 to ensure that each of the compact disc filers 20, 22, and 24 receives the correct data. The compact disc filers 20, 22, and 24 echo the commands back to the host computer 12 as an acknowledgment of command reception. The lack of an acknowledgment indicates filer malfunction or filer absence.

The function of the multiplexer 98 is to enable outputs from the transceiver 101 only when the compact disc filer in which the multiplexer 98 is located contains the compact disc 50 that has been selected using the keyboard 18. The control of the outputs of the transceivers 101 in each of the compact disc filers 20, 22, and 24 is performed with a token mechanism. The token signal appears on line 104 as a signal TOKEN_OUT, which will hereinafter be described.

Each of the compact disc filers 20, 22, and 24 supports fifty-six compact disc slots 38. The slots 38 are addressed and activated by asserting an LED/solenoid row and an LED and/or solenoid column. Each of the fifty-six slots are assigned a slot number from one to fifty-six denoting where they physically are in the casings 36 of the compact disc filers 20, 22, or 24.

The compact disc filers 20, 22, and 24 are controlled by commands issued by the host computer 12 transported by the serial communication protocol previously discussed. There are two compact disc filer commands defined in the embodiment illustrated. These are: POKE and SHIFT_TOKEN. The POKE command is a compact disc filer command transport. It is a programmed input/output function that writes a specified byte value to one of three microcontroller ports. These three ports control the behavior of the visual LED communicators 54 and the solenoids 60. Each of these three ports have three bits which are fed to three respective discrete decoders 110, 112, and 114 which control the compact disc filer LEDs 54 and solenoids 60.

The host computer 12 transmits three bytes to complete a particular POKE operation. The first byte is a special code that indicates a command to the Z86 microprocessor to write to a register. Upon receipt of the POKE byte, the Z86 microprocessor is informed that it must capture the next two bytes transmitted to it. These next two bytes designate the port address and port value, respectively. This information is necessary to perform the rest of the POKE operation.

The decoders 110, 112, and 114 provide a matrix or routing system for the data signals. The three-bit value transmitted to the decoder 110 enables a particular solenoid column (numbered 0 through 7) to attach to power. This selection is used in tandem with the LED and solenoid row selection decoder 114 that selects the row of both the LED 54 and the solenoid 60. The decoder 112 enables a particular LED column (numbered 0 through 7) to attach to power. The signal to the decoder 112 is also used in tandem with the LED and solenoid row select decoder 114 to turn on a particular LED 54. Assertion of a solenoid row by decoder 114 and a solenoid column by decoder 110 completes the circuit for a particular solenoid 60, thereby turning it on. Row 7 of the decoder 114 is not attached to anything. It is selected when it is wished to deactivate all LEDs 54 and solenoids 60.

Figure 6B:
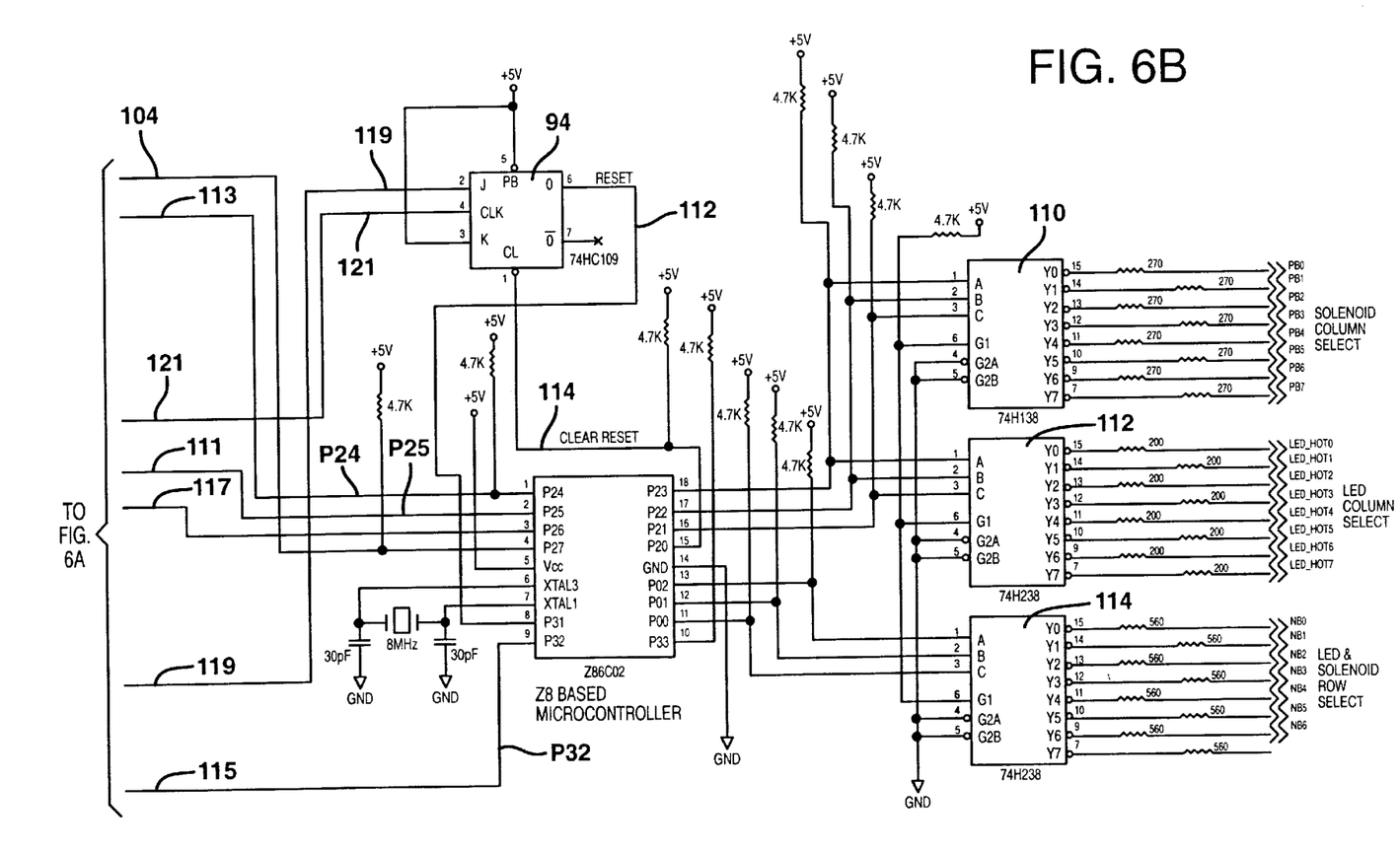
Figure 7:
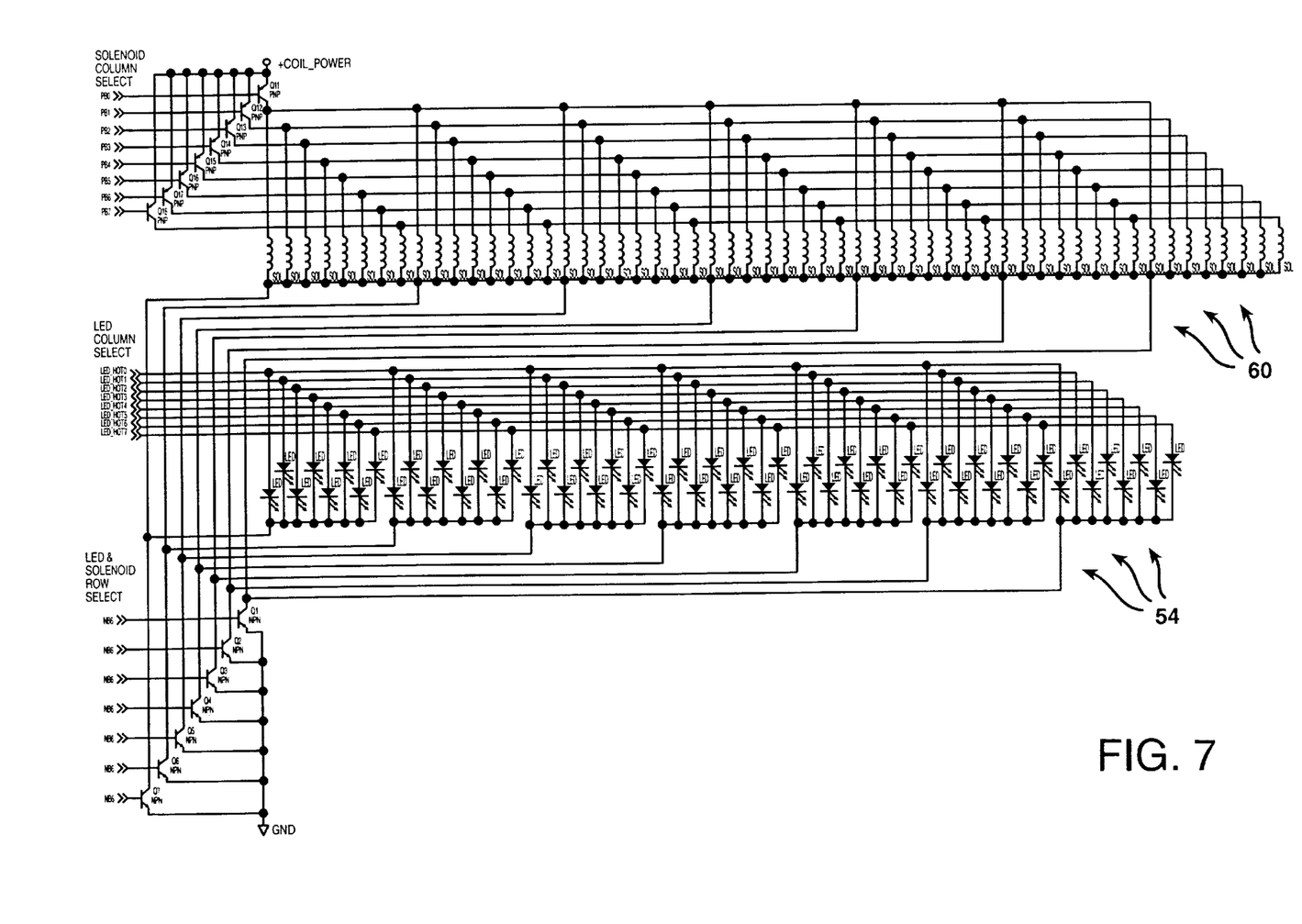
FIG. 7 is a schematic diagram of the compact disc filer visual indicator and solenoid circuitry found in each of the compact disc filers of FIG. 1.

Asserting or deasserting an LED or solenoid involves POKing a three-bit row and three-bit column value into the respective port specified by the port address. The port address is a three-bit value that is either zero for the LED/solenoid row select decoder 114, one for the LED column select decoder 112, or two for the solenoid column select decoder 110. If, for example, the port address is zero, decoder 114 will be actuated. The port value will then designate which of the specific rows of LED indicators 54 and solenoids 60 will be enabled. The decoder 114 performs this function by placing a voltage on one, and only one, of the lines NB0 through NB6, shown in FIGS. 6B and 7. This biasing voltage produces a current through the collector of the associated transistor Q1 through Q7.

The next portion of the POKE command will specify the port address of one, which produces an output from decoder 112. The port value that follows port address one specifies the LED column selected by a single one, and only one, of the column select lines LED_HOT0 through LED_HOT7. The concurrent activation of a selected one of the LED and solenoid row select lines NB through NB6 and LED column select lines LED_HOT0 through LED_HOT7 specifies a single one of the LEDs for illumination, which in the illustrations is the LED indicator 54 located at the compact disc slot 38 in which the selected compact disc 50 is located.

When the signal to port address two is received during the POKE operation, one, and only one, of the solenoid column select lines PB0 through PB7 is provided with a negative voltage. The selected solenoid column select line provides a base current to one, and only one, of the transistors Q11 through Q18. The solenoid 60 at the matrix intersection of the selected one of the solenoid column select lines PB0 through PB7 and the selected LED and solenoid row select lines NB0 through NB6 is energized to withdraw the latching fork 84 from the associated disc ejection mechanism 56 to cause the selected compact disc 50 to be pushed out of the case 36 of the compact disc filer 20, 22, or 24 in which it is located, as illustrated in FIGS. 2 and 4.

A compact disc filer responds to a command from the central processor 14 only if a token signal is asserted. The token is the means of addressing one particular compact disc filer in the filer topology. The exception to this is the PASS_TOKEN command which is processed by all filers in the topology. The PASS_TOKEN command is a broadcast command while all other commands are referenced commands. A filer receiving a command while the TOKEN signal is asserted is referred to as the referenced filer.

The referenced filer passes the echoed command data upstream through the TXD line while nonreferenced filers pass the TXD information they receive from their adjacent downstream neighbor on upstream. In other words, filers that do not contain the selected compact disc 50 pass the read data upstream while the referenced filer containing the selected compact disc 50 passes its own data upstream. This is the mechanism used for referenced filer queries.

The token system is utilized to designate which of the plurality of compact disc filers 20, 22, and 24 the host computer 12 is addressing with a POKE command. Since all of the CD filers 20, 22, and 24 are on line and receptive to receipt of commands from the host computer 12, it is necessary to limit response to a command to a particular one, and only one, of the CD filers 20, 22, and 24. Designation of the specific compact disc filer from which a response is desired is performed by passing an electronic token downstream. This function is performed by issuance of a SHIFT_TOKEN command from the host computer 12. The SHIFT_TOKEN command is a single byte command that instructs a filer to shift its token downstream. Shifting the token downstream essentially designates the downstream filer as having the token. Possession of the token indicates which of the compact disc filers 20, 22, or 24 the host computer 12 is addressing during the issuance of a command, data writing, and data reading. One, and only one, of the compact disc filers 20, 22, and 24 possesses the electronic token at any given time. The specific filer that does possess the token is targeted to receive data from the host computer 12 or transmit data to the host computer 12.

Figure 6A:
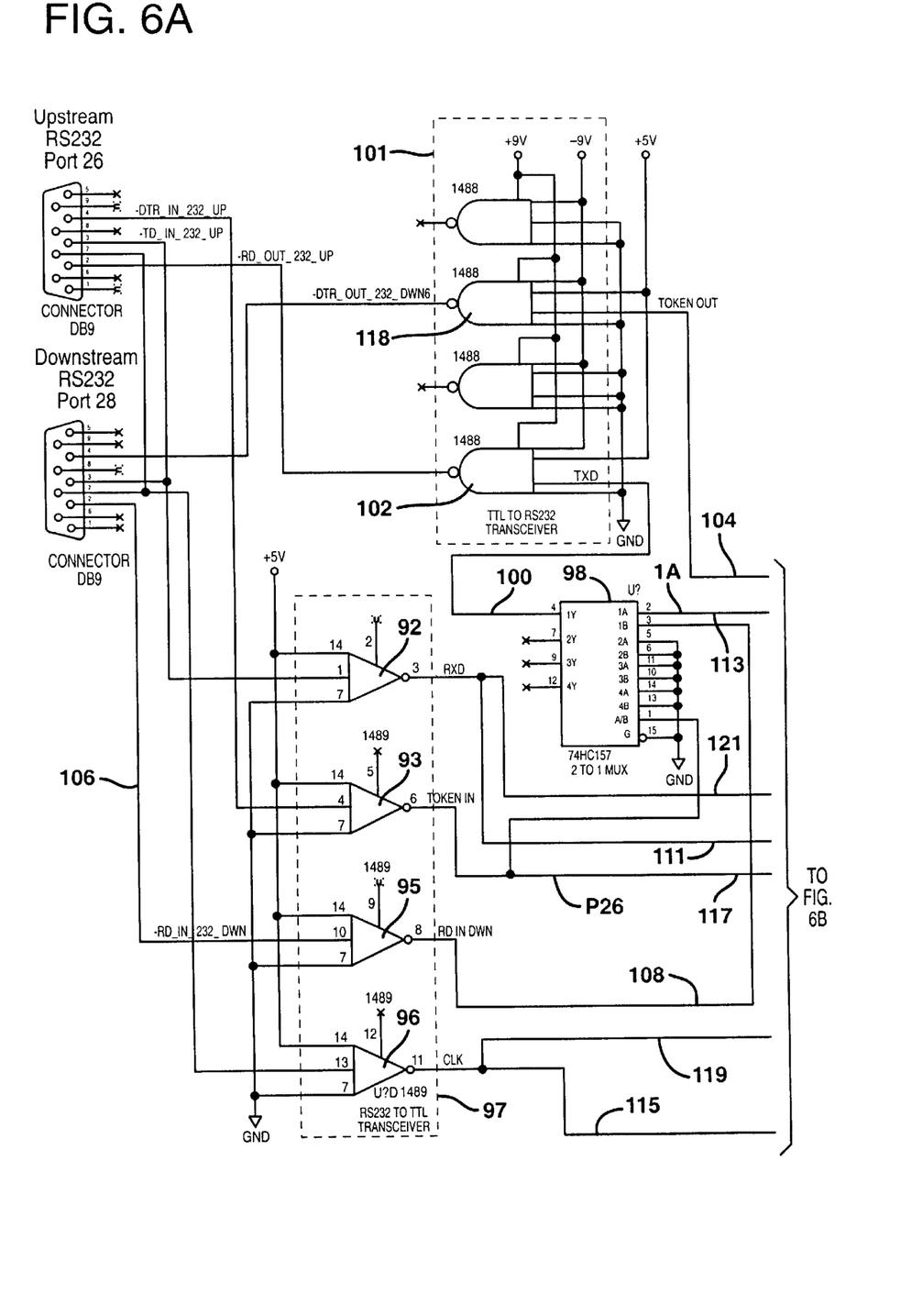
FIGS. 6A and 6B are schematic diagrams of the compact disc filer control and interface circuitry found in each of the compact disc filers shown in FIG. 1.

If the upstream compact disc filer 20 is being addressed, the host computer 12 provides a signal at Pin 4 of the upstream RS232 port 26 on line 30 to the voltage converter 93, shown in FIG. 6. The output of voltage converter 93 is transmitted as an input on line 117 to Pin P26 to the Z86 microprocessor. As a consequence, the multiplexer 98 of the compact disc filer 20 will transmit out the TXD signal through the NAND gate 102 of the transceiver 101.

If the host computer 12 has designated one of the downstream CD filers 22 or 24 as having the token, the TOKEN_IN signal appears at Pin 4 of the upstream RS232 port 26 of the upstream compact disc filer 20 and the host computer 12 will also issue a SHIFT_TOKEN command to the Z86 microprocessor of the upstream compact disc filer 20. This causes the input signal RD IN 232 DWN that appears on line 106 connected to voltage converter 95 in the compact disc filer 20 to indicate that a downstream one of the compact disc filers 22 or 24 has the token. The Z86 microprocessor of the upstream compact disc filer 20 is thereby bypassed by the output on line 108, which acts through the multiplexer 98 to produce the TXD output 100 to transceiver 101. If the SHIFT_TOKEN command is present, the output of the decoder 95 causes the Z86 microprocessor within an upstream compact disc filer to produce an output on its line 104, which is the TOKEN_OUT command. The TOKEN_OUT command on line 104 transmits a command to NAND gate 118 that in turn passes the token through the downstream port 28 of the compact disc filer 20 to the next compact disc filer downstream, which is compact disc filer 22. If the selected compact disc 50 is located even further downstream, the process of transmitting the signal through the voltage converter 95 to the Z86 microprocessor of the compact disc filer 22, which in turn provides a TOKEN_OUT signal on line 104 therefrom also occurs in compact disc filer 22.

Each of the compact disc filers 20, 22, and 24 receives the electronic TOKEN at Pin 4 of its upstream RS232 port 26 and, when commanded by the host computer 12, passes the TOKEN downstream through Pin 4 of its downstream RS232 port 28. Once the TOKEN has reached the appropriate compact disc filer, the host computer 12 provides no further SHIFT_TOKEN commands. The SHIFT_TOKEN command functions in a manner analogous to a shift register in which a particular signal is shifted sequentially from one register to the next. Only the compact disc filer 20, 22, or 24 to which the token has been shifted will respond to the POKE command of the host computer 12.

The system also includes a RESET capability. A RESET is performed by the host computer 12 by a positive transition on the RXD signal from voltage converter 92 while the CLK signal on voltage converter 96 is high. The concurrence of this condition signifies a RESET condition. This condition is sensed in all of the compact disc filers 20, 22, and 24 concurrently. When it exists, all compact disc filers proceed to reset.

Figure 10:
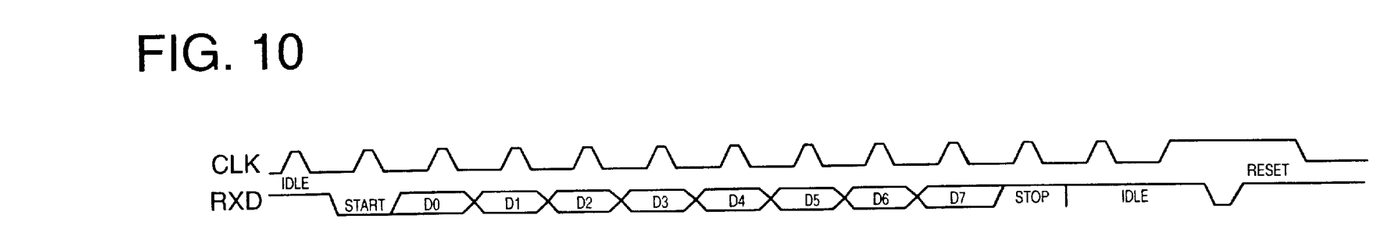
FIG. 10 is a timing diagram depicting a sequence for resetting the compact disc filers of FIG. 1.

RESET signals are generated when error conditions occur. For example, if the host computer 12 receives an erroneous echo signal back from one of the Z86 microprocessors, a malfunction is assumed. The host computer 12 thereupon issues a signal down the entire bus lines that passes through Pins 3 and 7 of all of the ports 26 and 28 to instruct all of the Z86 microprocessors in all of the compact disc filers 20, 22, and 24 to RESET. The generation of a RESET signal is depicted by the waveforms shown in FIG. 10. Specifically, when a CLK signal is held high during the time that the RXD signal makes a low to high transition, a RESET signal is generated and directed concurrently to all of the compact disc filers 20, 22, and 24.

The RESET condition is detected in each compact disc filer by the JK flip-flop 94, which generates a RESET signal on line 112. In the flip-flop 94 the J input is from the CLK signal output of voltage converter 96 and the clock input to the JK flip-flop 94 is from voltage converter 92 on line 121. The RESET signal on line 112 causes the Z86 microprocessor to return to an idle state awaiting a start bit of a command signal. Incident to this return to the idle state, the Z86 microprocessor generates a CLEAR_RESET signal on line 114, which resets the JK flip-flop 94.

There is a JK flip-flop 94 for every one of the compact disc filers 20, 22, and 24. Also, all of the CD filers are concurrently coupled to receive the RXD and CLK signals. Consequently, when a RESET condition is created, it is transmitted to all of the compact disc filers, which are all RESET at the same time.

Concurrent transmission to all compact disc filers is possible since Pin 3, carrying the RXD signal into the upstream port 26 of each compact filer is connected to Pin 3 of the downstream RS232 port 28 of the same compact disc filer. Similarly, Pin 7 of the upstream RS232 port 26 of each compact disc filer is connected to Pin 7 of the downstream RS232 port 28 of that same compact disc filer. Thus, the RXD and CLK signals from the host computer 12 are transmitted both to each compact disc filer through Pins 3 and 7 at the upstream port 26 thereof, and to all downstream compact disc filers through Pins 3 and 7 of the downstream RS232 port 28 thereof.

To summarize operation of the system, a user provides a keyboard input to the host computer 12 through the keyboard 18. This input may be the first few letters of a title of a compact disc desired. A portion of a menu containing these alphanumeric characters appears on the monitor 16. If necessary, the user can manipulate the keyboard to move the cursor up or down to change or lock in a selection. The keyboard 18 thereby serves as a signal generating input device for specifying a multiplicity of electronic addresses.

Depression of the ENTER key on the keyboard activates an electronic routing system that is connected between the keyboard 18 and the solenoid 60 to define a unique address for each of the solenoids 60 responsive to entries on the keyboard, which serves as an entry address signal generating input device. The designation of a particular compact disc title is treated as a keyboard storage slot identification entry. This entry actuates only the solenoid 60 located at the storage slot 38 identified which contains the selected compact disc 50. The latching mechanism 58 for the disc ejection mechanism 56 associated with the selected compact disc 50 is then released, thereby allowing the compact disc ejection mechanism 56 thereof to push the selected compact disc 50 forward from the position depicted in FIG. 3 to the position depicted in FIG. 4. This renders the compact disc readily visually distinguishable from the other compact discs 52 in the case 36, as illustrated in FIG. 2.

Undoubtedly, numerous variations and modifications of the invention will become readily apparent to those familiar with electronic manipulation of data. For example, it is to be understood that any number of compact disc filers can be coupled sequentially together, up to a maximum of eight due to voltage level limitations. Also, different hardware and software configurations may be employed to perform the routing functions required and to serve as an electronic matrix system.

It should be noted that the system of the invention not only facilitates location of a particular compact disc, but also particular files or selections of interest. For example, a user can utilize the keyboard 18 to type in sufficient information to identify a specific musical selection or file title without designating the particular album or file folder containing the selection of interest. As long as the software within the personal computer 12 has been provided with a list of the different selection names or file names on each compact disc, the user does not even need to know the title or folder identification of the compact disc upon which the selection or file of interest is stored. The determination of the storage slot address code is performed by conventional software within the central processing unite 14, which correlates the selection or file with the compact disc upon which that selection or file is stored automatically. The necessary signals to eject the appropriate compact disc are thereupon generated in the manner previously described.

The term "compact disc", as employed herein, is utilized in its broadest sense, which is a modular recorded medium upon which audio or video selections or other data has been stored in a compact, electronically encoded form. The definition of "compact discs" employed herein encompasses, but it not limited to, recorded audio and video CDs, CD ROMs, DVD recordings, 1.4 MG and 760 K "floppy discs", video and audio tape cassettes, and karaoke recordings. Accordingly, the scope of the invention should not be construed as limited to the specific embodiment illustrated and described.

I claim:

1. A compact disc storage and retrieval system comprising:

a compact disc filer having a plurality of compact disc storage slots located adjacent each other and delineated from each other by a plurality of guides located therebetween;

at least one compact disc ejection mechanism mounted on said compact disc filer and operable at each of said compact disc storage slots, said ejection mechanism being operable to move between a retracted position which permits said compact discs to reside stored within said storage slots and an ejection position in which a selected compact disc is forced at least partially out of said storage slot;

a keyboard through which said compact disc storage slots are selectively individually addressable with an electronically encoded address; and a personal computer including a central processing unit connected to said keyboard and to said disc ejection mechanism to transmit a storage slot address code selected at said keyboard to actuate said disc ejection mechanism at only a single one of said disc storage slots.

2. A compact disc storage and retrieval system according to claim 1 further comprising a separate visual indicator located proximate each of said compact disc storage slots, and said central processing unit is connected to said visual indicators to transmit a signal to concurrently illuminate the visual indicator located at the same compact disc storage slot at which said disc ejection mechanism responds to said selected storage slot address code.

3. A compact disc storage and retrieval system according to claim 1 further comprising a plurality of compact disc filers as aforesaid connected together through serial electronic connectors.

* * * * *